Dec. 18, 1956 C. J. DAVIES 2,774,410
METHOD AND APPARATUS FOR TENSIONING AND EDGE TURNING THE
COVER MATERIAL OF AUTOMOBILE DOOR LAMINATED PANELS
Filed Aug. 31, 1953 8 Sheets-Sheet 2

FIG. 7.

INVENTOR.
CLARENCE J. DAVIES
BY Whittemore
Hulbert & Belknap
ATTORNEYS

Dec. 18, 1956 C. J. DAVIES 2,774,410
METHOD AND APPARATUS FOR TENSIONING AND EDGE TURNING THE
COVER MATERIAL OF AUTOMOBILE DOOR LAMINATED PANELS
Filed Aug. 31, 1953 8 Sheets-Sheet 3

INVENTOR.
CLARENCE J. DAVIES
BY Whittemore,
Hulbert & Belknap
ATTORNEYS

Dec. 18, 1956 C. J. DAVIES 2,774,410
METHOD AND APPARATUS FOR TENSIONING AND EDGE TURNING THE
COVER MATERIAL OF AUTOMOBILE DOOR LAMINATED PANELS
Filed Aug. 31, 1953 8 Sheets-Sheet 5

INVENTOR.
CLARENCE J. DAVIES
BY Whittemore,
Hulbert & Belknap
ATTORNEYS

Dec. 18, 1956     C. J. DAVIES     2,774,410
METHOD AND APPARATUS FOR TENSIONING AND EDGE TURNING THE
COVER MATERIAL OF AUTOMOBILE DOOR LAMINATED PANELS
Filed Aug. 31, 1953     8 Sheets-Sheet 7

FIG.15.

INVENTOR.
CLARENCE J. DAVIES
BY Whittemore,
Hulbert & Belknap
ATTORNEYS

Dec. 18, 1956 C. J. DAVIES 2,774,410
METHOD AND APPARATUS FOR TENSIONING AND EDGE TURNING THE
COVER MATERIAL OF AUTOMOBILE DOOR LAMINATED PANELS
Filed Aug. 31, 1953 8 Sheets-Sheet 8

INVENTOR.
CLARENCE J. DAVIES
BY Whittemore,
Hulbert & Belknap
ATTORNEYS.

United States Patent Office 2,774,410
Patented Dec. 18, 1956

2,774,410
METHOD AND APPARATUS FOR TENSIONING AND EDGE TURNING THE COVER MATERIAL OF AUTOMOBILE DOOR LAMINATED PANELS

Clarence J. Davies, Detroit, Mich., assignor to National Automotive Fibres, Inc., Detroit, Mich., a corporation of Delaware Application August 31, 1953, Serial No. 377,338
19 Claims. (Cl. 154—41)

The present invention relates to apparatus for tensioning and edge turning covers on panels to produce laminated panels.

It is an object of the present invention to provide apparatus of the character described which is fully automatic in operation and which applies adhesive to the rear marginal portions of a panel board, tensions the cover, clamps the cover and panel together to retain tension in the cover, and thereafter forms the marginal edge portion of the cover around the rear of the panel and presses it against the adhesive.

It is a further object of the present invention to provide edge turning apparatus comprising a support for an assembly of panel and cover, a frame movable perpendicularly to the support having frictional tensioning means engageable with a marginal portion of the cover to draw it against the side of the support to tension the cover, means for pressing the cover and panel assembly against the support to retain pressure in the cover, and means for forming the marginal edge portion of the cover rearwardly around the edge of the panel and pressing it against the rear marginal edge portion thereof.

It is a further object of the present invention to provide in apparatus of the character described a flexible diaphragm adapted to extend around the periphery of a panel and cover assembly, and means for supplying a differential air pressure to the diaphragm to form the diaphragm inwardly to fold the marginal edge portion of the cover rearwardly around the edge of the panel and to press it against the rear marginal edge portion of the panel.

It is a further object of the present invention to provide apparatus for tensioning and edge turning a cover relative to a panel comprising a support, a frame movable perpendicularly to the plane of the support and including frictional tensioning means and edge turning means, a sealing and clamping plate movable perpendicularly to the plane of the support to engage the cover and panel assembly to retain tension in the panel, seal structure engageable by said frame upon completion of its movement in tensioning direction and adapted to be clamped thereto upon its return stroke, said sealing structure including a seal engagable with the underside of the support, said pressure and sealing plate including sealing means engageable with the upper side of said frame upon completion of its upward stroke, a flexible diaphragm carried by said frame, and means for evacuating the space between said sealing plate, the upper side of the panel and cover assembly, and said frame to form said diaphragm inwardly to turn the edge portion of the cover around and press it against the rear edge of the panel.

It is a further object of the present invention to provide, in combination with a stationary support, a combined pressure and sealing plate movable toward and away from the support, a frame movable in a direction perpendicular to the plane of the support and having three operating positions, means for effecting movement of the frame comprising a stationary cylinder, a piston within said cylinder, a piston rod extending outwardly from said cylinder, a second piston on the other end of said piston rod, a movable cylinder receiving said second piston, and means connecting said movable cylinder to said frame for effecting stepped movement thereof relative to said support.

Other objects and features of the invention will become apparent as the description proceeds, especially when taken in conjunction with the accompanying drawings, wherein.

Figure 5:
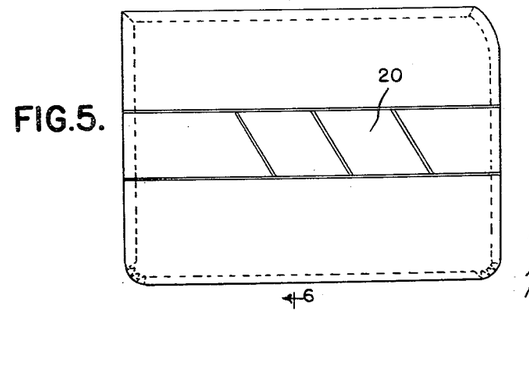
Figure 5 is a plan view looking at the front side of a panel assembly.
Figure 6:
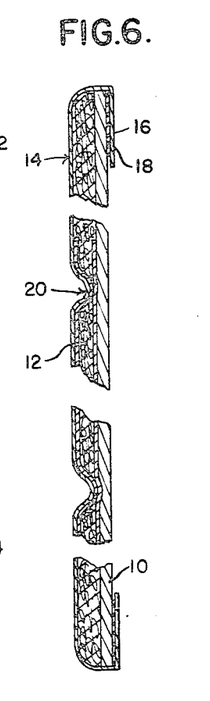
Figure 6 is an enlarged fragmentary sectional view on the line 6—6, Figure 5.
Figure 7:
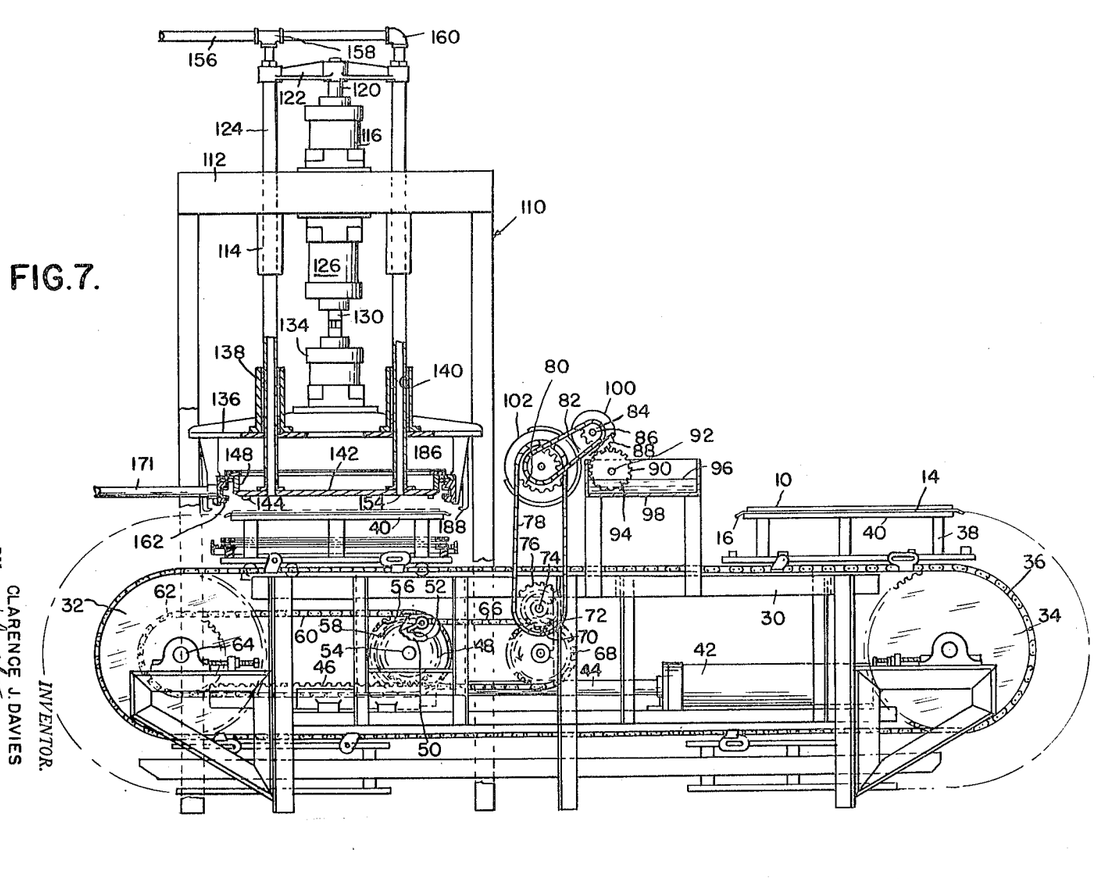
Figure 7 is a side elevational view partly in section of automatic apparatus for tensioning and edge turning a cover relative to a panel.
Figure 8:
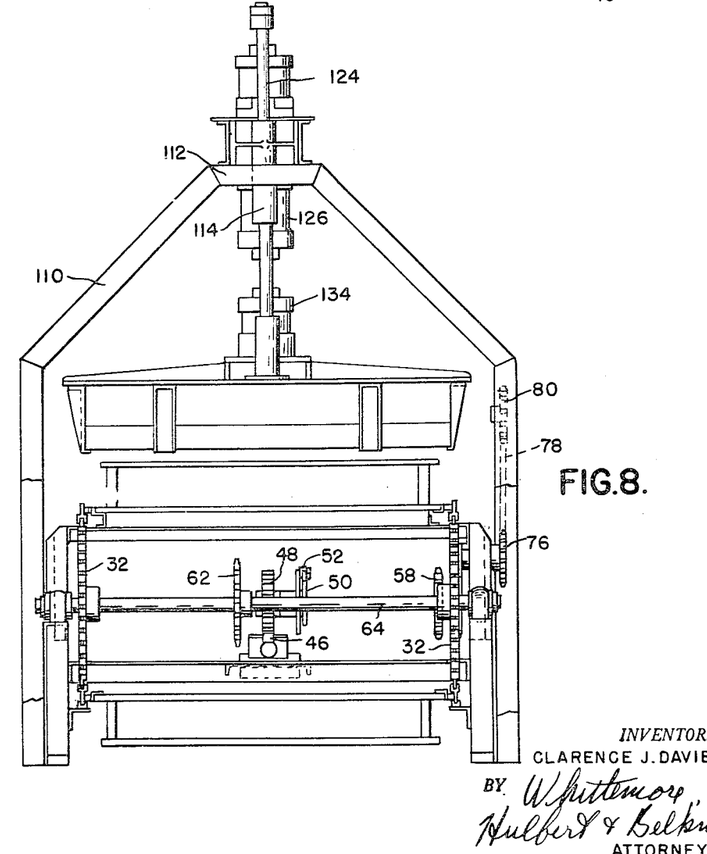
Figure 8 is a front elevational view of the apparatus shown in Figure 7.

The present invention is concerned with automatic apparatus for producing cover trim panels such as illustrated in Figures 5 and 6 of the drawings. Trim panels of this type are used in automobiles and other vehicles. As best seen in Figure 6, the laminated panel comprises a panel board 10 over the front surface of which is provided padding material 12, and a trim or cover fabric 14 is provided over the padding. The marginal portions of the cover as illustrated at 16, are adhered to the rear marginal edge portions of the panel board 10 by adhesive indicated at 18. The trim panel illustrated in Figure 6 has a decorative embossed design indicated at 20 provided thereon but this does not enter into the present invention except that the present method and apparatus are useful in the production of the panel boards which by later treatment may be given an embossed decoration of the type shown at 20 in Figure 6.

Figure 1:
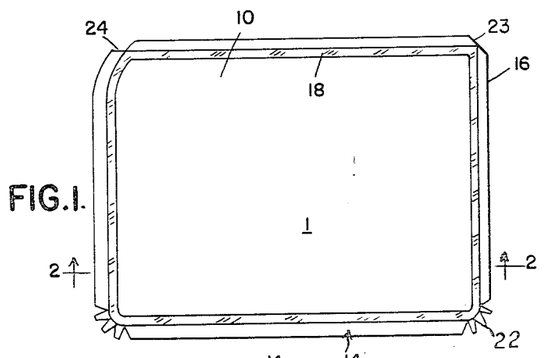
Figure 1 is a plan view of the rear side of a panel and cover assembly with adhesive applied to the panel.
Figure 2:
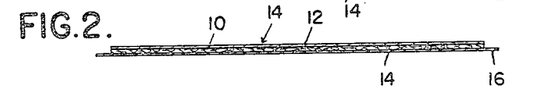
Figure 2 is a sectional view of the assembly of Figure 1, taken on the line 2—2, Figure 1.

In Figure 1 there is shown an assembly in which the panel board 10 has a band of adhesive 18 applied around its marginal rear edge portion. The cover 14 is applied to the front of the panel, overlying padding material such as the material 12 if this is used, and the marginal portions 16 of the cover extend outwardly beyond the edges of the panel. The cover is given suitable configuration at the corners as illustrated at 22, 23, and 24, providing for edge turning of the margins of the cover without wrinkling.

Figure 3:
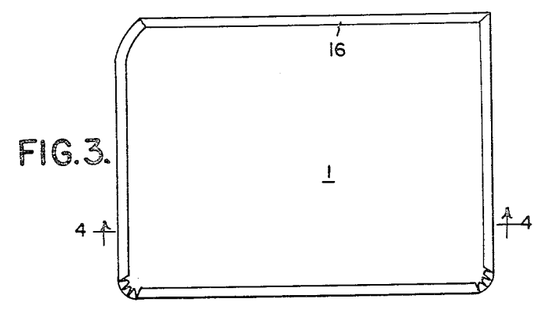
Figure 3 is a plan view of the assembly shown in Figure 1, with the marginal portions of the cover folded rearwardly and adhered to the rear of the panel.
Figure 4:
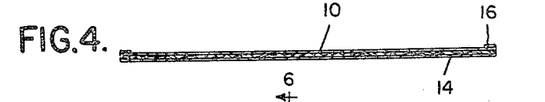
Figure 4 is a sectional view of the assembly shown in Figure 3, taken on the line 4—4, Figure 3.

Referring now to Figures 3 and 4, the marginal edge portions 16 of the cover are shown as turned rearwardly and pressed against the adhesive to form the completed assembly.

The present apparatus is designed to operate in a fully automatic manner to apply the band of adhesive to the rear marginal edge portion of the panel, to tension the cover, and to turn the edges of the cover around and press them into engagement with the adhesive at the rear of the panel.

Referring now to Figures 7–14 the apparatus comprises a horizontal table 30 having sprockets 32, 34 at opposite ends thereof over which a continuous carrier chain 36 is trained. Secured to the carrier chain 36 are a plurality of carriers 38 which are adapted to be intermittently advanced from the right to the left along the top of the table 30. The position of the carrier support shown at the right of Figure 7 may be regarded as a loading station at which point a cover 14 and panel 10 are mounted on a support plate 40, the support plate conforming in size and shape to the panel. As illustrated, the support plate 40 is slightly larger than the panel.

The means for intermittently advancing the supports comprises an air cylinder 42 having a piston therein connected to a piston rod 44 provided with a rack section as indicated at 46, and associated with a pinion 48 in mesh with the rack. The pinion 48 has a one-way driving connection to a plate 50, this driving connection being indicated as the drive finger 52 associated with a finger receiving notch on the plate 50. The plate 50 is connected to a shaft 54 carrying drive sprockets 56 and 58. The sprocket 56 is connected by a chain 60 to the sprocket 62 carried by the shaft 64, which shaft in turn carries the sprockets 32. The sprocket 58 is connected by a chain 66 to a sprocket 68 carrying a gear 70 meshing with a pinion 72 mounted on a shaft 74 carrying a sprocket 76, which latter is connected by a chain 78 to a sprocket 80. The sprocket 80 is connected to a second coaxial sprocket which in turn connects by a chain 82 to a sprocket 84 carried by a shaft 86. On the shaft 86 is provided a gear 88 meshing with the gear 90 carried by the shaft 92 on which the adhesive pick up roll 94 is secured. It will be appreciated that as the piston is traversed in the cylinder, the carrier chain 36 is advanced, and the adhesive pick up roll is rotated in adhesive 96 contained within a tank 98 and is transferred through a roll 100 to the applicator roll 102.

Figure 9:
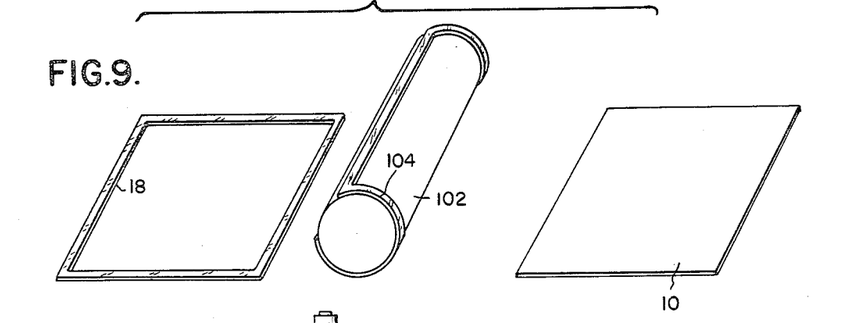
Figure 9 is a diagrammatic view illustrating the manner of applying adhesive to the panel.

As best seen in Figure 9, the applicator roll 102 is provided with a mask 104 shaped to conform to the edge of the panel so that as the panel is advanced from the right to the left, as seen in this figure, the band of adhesive as indicated at 18, is applied thereto.

Superimposed over the table 30 at the tensioning and edge turning station is a frame construction indicated generally at 110 which includes a stationary cross piece 112 in which are mounted vertically extending tubular guides 114. Mounted on the cross piece 112 is a cylinder 116 having a piston 118 (see Figure 10a) therein and a piston rod 120 connected to a cross head 122 secured to a pair of tubular pipes 124 which are vertically movable in the tubular guides 114. Depending from the underside of the cross piece 112 is a second cylinder 126 having a piston 128 (see Figure 10a) therein, and a downwardly extending piston rod 130. At the lower end of the piston rod 130 is a second piston 132 (see Figure 10a) received within a third cylinder 134. The cylinder 134 is itself connected to a cross head 136 which includes tubular guides 138 through which the tubular pipes 124 extend, the guides 138 being provided with suitable bearings, as indicated at 140.

Figure 10:
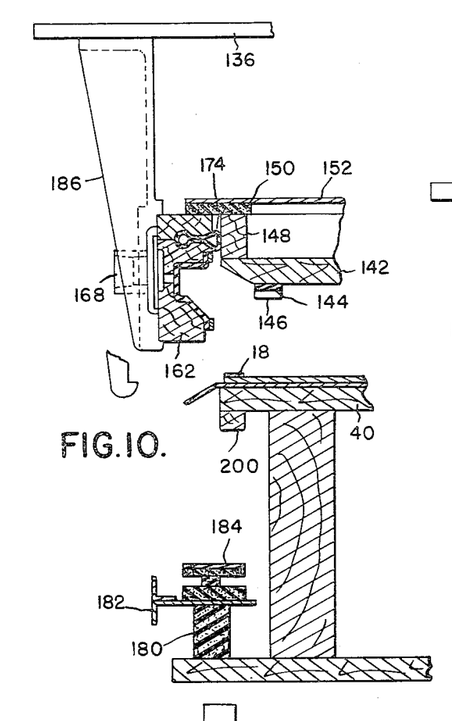
Figure 10 is a fragmentary sectional view showing the initial position of the operating mechanism.
Figures 10A, 11A:
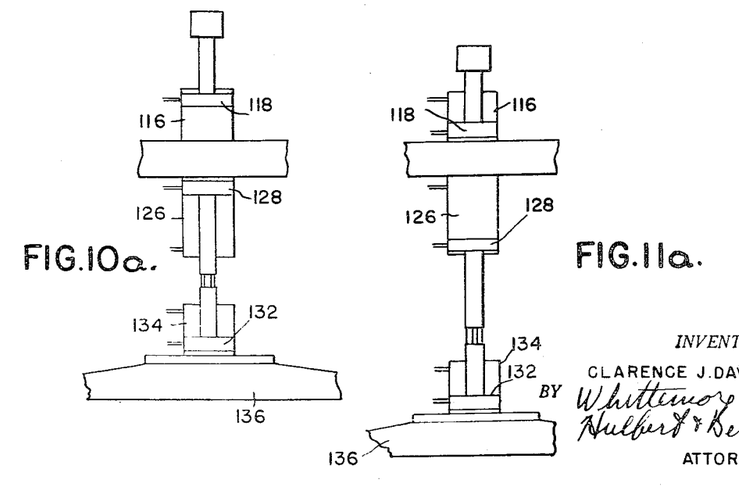
Figure 10a is a view showing the relative positions of the pistons and cylinders when the parts are in the position illustrated in Figure 10.
Figure 11a is a view showing the relative positions of the pistons and cylinders when the parts are in the position illustrated in Figure 11.

At the lower end of the pipes 124 there is provided a plate 142 which at its underside and adjacent the periphery thereof is provided with a pressure pad 144 best seen in Figure 10. The pressure pad is preferably notched as indicated at 146 to provide for the passage of air, as will subsequently be described. Around the upper side of the periphery of the plate 142 is an upwardly extending strip 148 on which is received an upper sealing strip 150 secured to the underside of a seal supporting member 152. The plate 142 is provided with openings 154 in registration with the open ends of the pipes 124 so as to permit passage of air therethrough.

At the upper ends of the pipes 124 there is connected a flexible conduit 156 having fittings 158 and 160 connecting the conduit 156 to the interior of the pipes 124, for a purpose which will subsequently be described.

Figure 19:
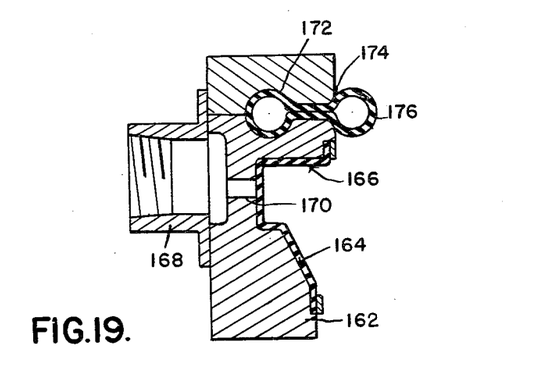
Figure 19 is an enlarged sectional view through an element of the frame used in the present invention.

Carried by the cross piece 136, which is connected to the movable cylinder 134, is a hollow open frame 162 slightly larger than the support 40. Where the panel to which the cover is to be applied is rectangular it will be appreciated that both the support 40 and the frame 162 will be rectangular. In this case the frame 162 will of course comprise four bars interconnected at their corners to produce an open rectangular frame. Each of the bars has a cross-sectional configuration as illustrated in Figure 19. It will be observed that each bar of the frame is provided with a relatively deep recess 164 overlying which is a flexible diaphragm 166, the upper and lower edges of which are secured in sealing relation to the inner surface of the frame element at opposite sides of the recess 164. A nipple 168 is connected to the frame in communication with a passage 170 which extends into the bottom of the recess beneath the flexible diaphragm 166. The nipple is adapted to be connected to a flexible conduit 171 which connects through suitable valve control mechanism to a source of sub-atmospheric pressure, such for example as a vacuum pump. Adjacent their upper edges the frame elements are recessed as indicated at 172 and receive a generally tubular friction member 174, a portion of which as indicated at 176 extends inwardly of the frame in position to frictionally engage the marginal portion of the cover. The tubular friction element 176 is preferably sealed and may be provided with suitable valve means so that it can be supplied with a controllable air pressure to vary the frictional drag of its portion 176 on marginal portions of the cover in use.

Each of the carriers 38 is provided with a support cushion 180 on which rests a seal retainer 182 carrying a lower seal element 184 which conforms in shape to the support 40.

Figures 12, 13:
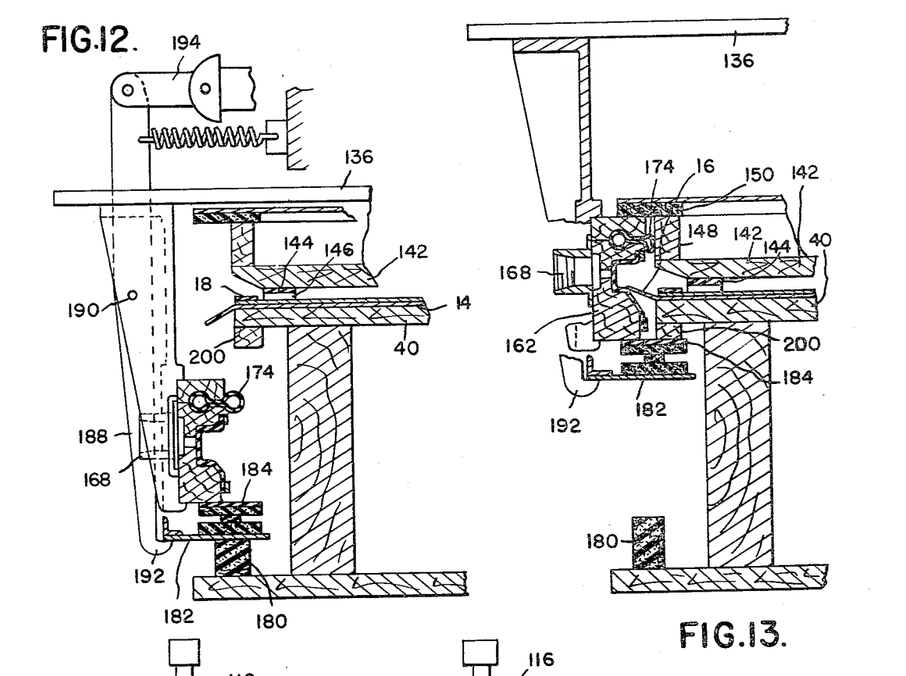
Figure 12 is a view similar to Figure 10 showing the position of the operating mechanism at the second stage of the operation.
Figure 13 is a view similar to Figure 10 showing the position of the operating mechanism at the third stage of the operation.
Figure 12A:
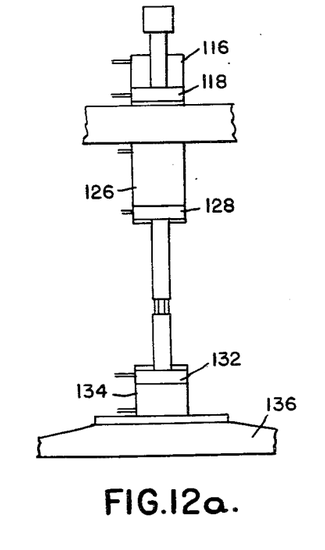
Figure 12a is a view showing the relative positions of the pistons and cylinders when the parts are in the position illustrated in Figure 12.
Figure 13A:
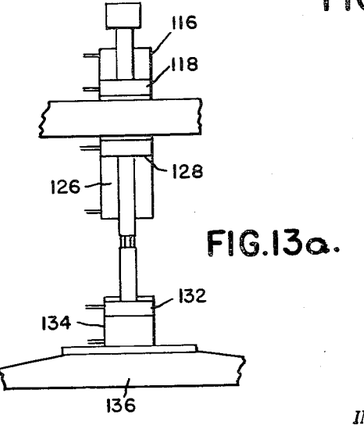
Figure 13a is a view showing the relative positions of the pistons and cylinders when the parts are in the position illustrated in Figure 13.
Figure 14:
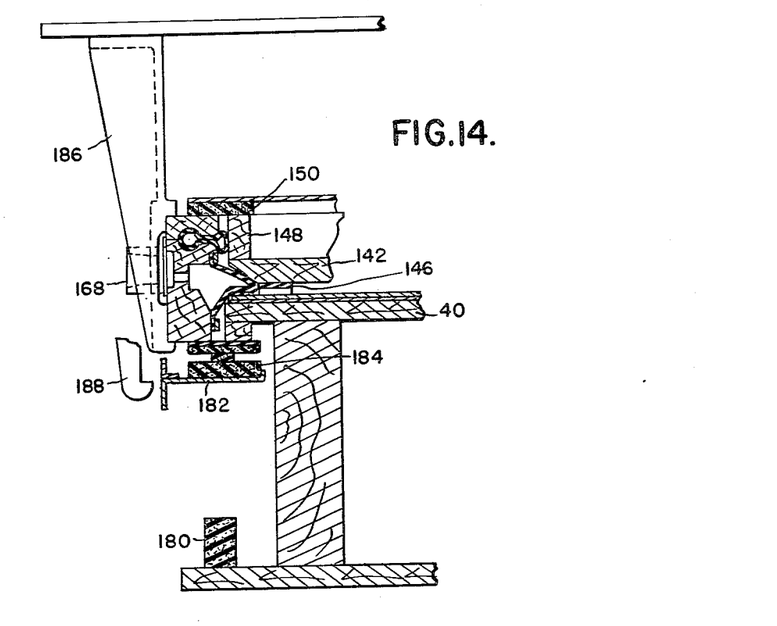
Figure 14 is a view similar to Figure 10 showing the position of the operating mechanism at the fourth stage of the operation.

The frame 162 is suspended from the underside of the cross head 136 by depending arms 186 and the arms 186 have pivoted thereto latch fingers 188, the pivot connection being illustrated at 190. The lower ends of the latch fingers 188 have inwardly projecting latch portions 192 adapted to engage under the seal retainer 182, as best illustrated in Figure 12. At their upper end the latch fingers 188 are connected by links 194 to retaining finger solenoids which will be described in connection with the wiring diagram.

Having described the structure of the apparatus, attention is now directed to Figures 10–14 which illustrate the sequence of operation. A panel and cover assembly is positioned on the plate or support 40 at the loading station and is advanced beneath the applicator roll 102, at which time adhesive is applied to the upwardly exposed rear edge portions of the panel, the cover at this time being disposed between the panel and the support 40. When the support 40 comes to rest in position at the tensioning and edge turning station, the parts are in the position illustrated in Figures 10 and 10a. At this time it will be observed that the piston 118 is at the top of cylinder 116, the piston 128 is at the top of cylinder 126, and cylinder 134 is in its upper position with respect to its piston 132. Accordingly, the cross head 136 is in its uppermost position and the cross head 122 which is connected to the pressure and sealing plate 142, is also in its upper position. The lower seal 184 and its seal retainer 182 are in the lower position resting upon the retainer cushion 180. At this time a pressure differential is established in cylinder 126 tending to move the piston 128 downwardly, at which time the cross head 136 moves downwardly to the position illustrated in Figure 11 where it comes to rest. During this downward movement of the frame 162 the flexible frictional tensioning tube 174 engages the marginal portion 16 of the cover 14 and tensions the cover uniformly. As indicated previously, the degree of tension imparted to the cover may be varied by controlling the air pressure within the tubular friction device, and it may also be varied by vertical adjustment of the frame 162, to raise or lower the tube 174 in relation to the support 40. It will also be observed that tensioning of the cover takes place by frictional drag applied to the marginal portion 16 of the cover 14 against the side of the support 40 so that a substantial supporting area is provided against which the marginal portion of the cover may be pressed and across which it may be dragged by the tensioning tube 174. When the cross head 136 has reached the position illustrated in Figure 11 a pressure differential is established in the cylinder 116 tending to move the piston 118 downwardly and this is transmitted through the cross head 122 and tubular members 124 to move the sealing and pressure plate 142 downwardly to the position illustrated in Figure 11. At this time the cover will have been tensioned to the required degree, and the pressure pad 144 engaging the rear surface of the panel 10 inwardly from the adhesive band 18 prevents slipping of the cover and thereby retains the tension developed therein by the tensioning tube 174.

After engagement between the pressure pad 144 with the panel and cover assembly, a pressure differential is established in the cylinder 134 tending to move the cylinder downwardly with respect to the piston 132 and this downward movement is transmitted to the cross head 136. The frame 162 is moved downwardly into engagement with the lower seal element 184, thus establishing an air-tight seal around the lower edge of the frame 162. At the same time, the latching fingers 188 engage in notches in the seal retainer 182 preparatory to lifting the seal retainer and associated lower seal upon the next upward movement of the cross head 136.

At this time differential pressure is admitted into the cylinder 126 in a direction to raise the piston 128 therein and this raises the frame 162 and the seal retainer 182 as a unit, the lower seal engaging a sealing rib 200 carried at the lower side of the support 40. At the same time the upper inner edge of the bars of the support frame 162 engage the outer periphery of the upper seal 150, thereby constituting a completed sealed enclosure defined by the support 40, the rim 200, the lower seal 184, the frame 162, the upper seal 150, the strip 148, and the sealing plate 142.

Up to this time the continuous recess 164 at the inner side of the frame 162 was subjected to less than atmospheric pressure through the nipple 168 and conduit 171. At this time however, vacuum is cut off from the recess and the sealed space just defined is connected to vacuum through the flexible conduit 156, the pipes 124, and the openings 154. Upward movement of the frame 162 to the position illustrated in Figure 13 will have moved the marginal portions 16 of the cover slightly upwardly. The application of vacuum to the sealed space just defined together with admission of atmospheric pressure through the conduit 171 forces the flexible diaphragm 166 inwardly to the position illustrated in Figure 14, at which time it folds or turns the marginal portion 16 of the cover around the edge of the panel 10 and presses it firmly and uniformly against the band of adhesive 18 exposed thereat. Finally, the latch fingers 188 are released at this time permitting the seat retainer 182, together with the lower seal 184, to fall downwardly against the retainer cushion 180. This completes the edge turning operation and the parts return to the position illustrated in Figures 10 and 10a by establishing a differential pressure in piston 116 to move the piston 118 upwardly therein and by establishing differential pressure within the cylinder 134 to cause it to move upwardly with respect to the piston 132, thereby restoring the parts to the position illustrated in Figures 10 and 10a.

Figure 15:
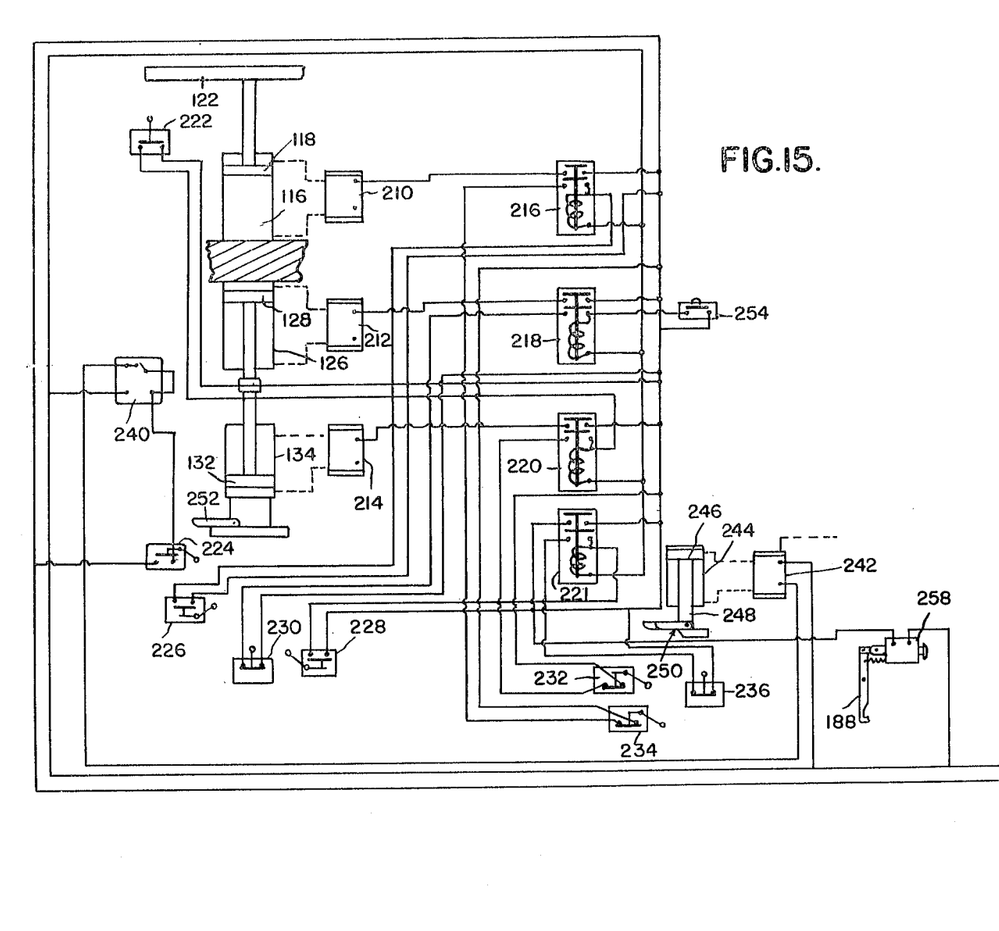
Figure 15 is a simplified wiring diagram explaining the operation of the actuating mechanism.

Referring now to Figure 15 there is illustrated a wiring diagram showing the actuation of the mechanism. The cylinders 116, 126, and 134 are connected to solenoid valves 210, 212, and 214 respectively and these solenoid valves are connected as illustrated respectively to relays 216, 218 and 220. A fourth relay indicated at 221 is provided. Normally open limit switches 222, 224, 226 and 228 are provided and normally closed limit switches 230, 232, 234 and 236 are also provided. A timer 240 is provided and is connected to a valve 242 which controls a vacuum cylinder 244 having a piston 246 therein connected to a piston rod 248 carrying switch actuating means 250. It will be observed that the vertically movable cylinder 134 has a pivoted switch actuator 252 associated therewith and that the cross head of the piston 118, which is diagrammatically illustrated in this figure at 122, will actuate limit switch 222. The circuit is provided with a starting switch 254.

Figure 11:
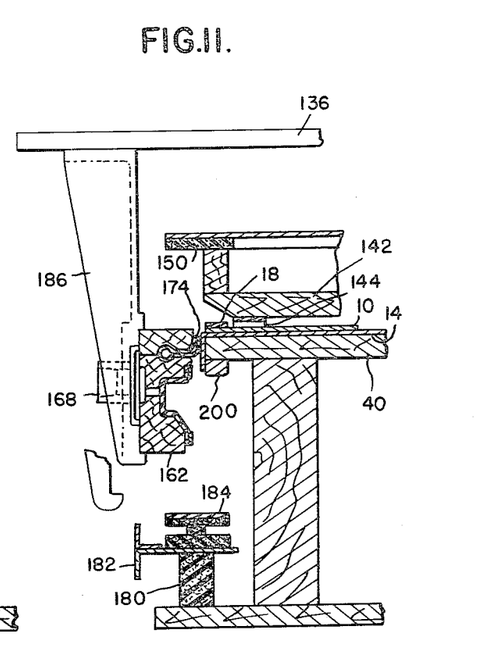
Figure 11 is a view similar to Figure 10 showing the position of the operating mechanism at the first stage of the operation.

When the starting switch 254 is closed relay 218 is energized and solenoid valve 212 is energized to move the piston 128 downwardly in the cylinder 126, thereby moving the frame 162 downwardly to the position illustrated in Figure 11. During this downward movement normally open limit switch 224 is bypassed and normally open limit switch 226 is closed. Relay 216 and solenoid valve 210 are thus energized and air is admitted to cylinder 116 to move the piston 118 downwardly, thereby closing normally open limit switch 222. Downward movement of the piston 118 moves the piston and sealing plate 142 downwardly into engagement with the assembly of panel and cover. Closure of limit switch 222 energizes relay 220 and solenoid valve 214, thereby admitting air in a direction to move the cylinder 134 downwardly relative to piston 132 which at this time is stationary. This results in further downward movement of the frame 162 to the position illustrated in Figure 12. This downward movement results in opening normally closed limit switch 230 and closure of normally open limit switch 228. Opening of normally closed limit switch 230 will deenergize relay 218 and solenoid valve 212, moving the piston 128 upwardly in the cylinder 126, resulting in upward movement of the frame 162 to the position illustrated in Figure 13. This results in closure of normally open limit switch 224 which starts the timer and vacuum cycle. Closure of normally open limit switch 228 energizes relay 221 and a solenoid 258 which controls the latch fingers 188. However, release of the latching fingers 188 occurs after vacuum has been applied to the space closed by the lower seal 184, and the seal retainer 182 and seal 184 are retained in sealing position by vacuum so long as the vacuum continues to be applied. When the piston 246 of the vacuum cylinder 248 reaches bottom, normally closed limit switch 236 will be opened to de-energize solenoid 258 and relay 221, When the timer 240 has made its cycle the vacuum solenoid will be de-energized and move the piston of the vacuum cylinder 244 upwardly opening normally closed switches 232 and 234 to reverse the differential pressure in cylinders 116 and 134, thereby completing the cycle. It will be appreciated that the timer 240 may be adjustable to retain pressure of the diaphragm 166 for the required period to insure adhesion between the marginal portions 16 of the cover 14 with the band of adhesive 18 at the rear of the panel 10.

Figures 16, 17, 18:
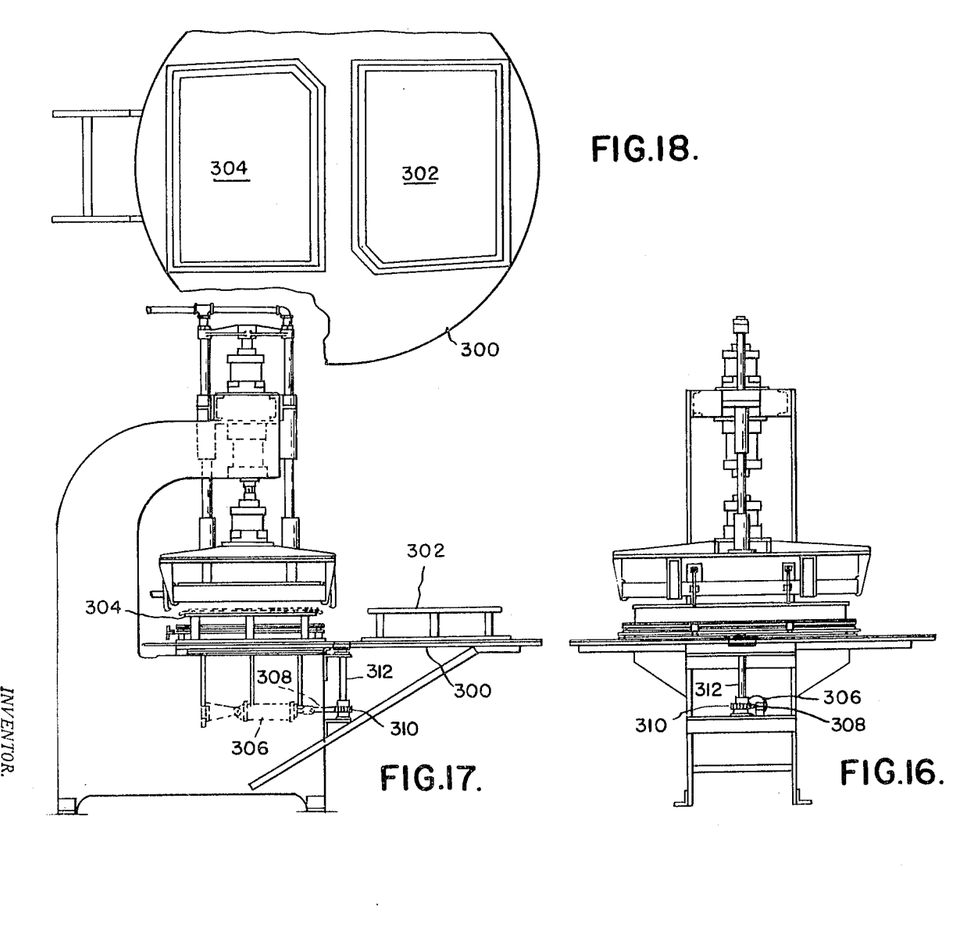
Figure 16 is a front elevational view of a different embodiment of the present invention.
Figure 17 is a side elevational view of the apparatus shown in Figure 16.
Figure 18 is a fragmentary plan vew of the apparatus shown in Figure 16.

Referring now to Figures 16–18 there is illustrated another embodiment of the present invention which differs primarily in the means for intermittently advancing panel supports from a loading position to working position. In this case the edge turning and sealing machanism is as described in the preceding embodiment and the description thereof will not be repeated. In this embodiment of the invention there is provided a turntable 300 which as best illustrated in Figure 18, is provided with two supports 302 and 304. An air cylinder 306 has a piston therein connected to a rack 308 which actuates a pinion 310 secured to a shaft 312 to the upper end of which the turntable 300 is secured. Thus, actuation of the air cylinder results in angular movement of the turntable 300 to move one of the supports 302 or 304 from loading to edge turning position and vice versa. In this case the application of adhesive to the marginal rear portion of the panel will be manual.

The drawings and the foregoing specification constitute a description of the improved method and apparatus for tensioning and edge turning the cover material of automobile door laminated panels in such full, clear, concise and exact terms as to enable any person skilled in the art to practice the invention, the scope of which is indicated by the appended claims.

What I claim as my invention is:

1. Apparatus for tensioning and edge turning a cover of a laminated panel, which comprises a support conforming closely in size and shape to the panel against which the panel with its cover is positioned with the cover interposed between the panel and support with marginal portions of the cover extending beyond the edges of the panel and support, a frame movable relative to said support perpendicular to the plane of the panel, a friction device on said frame movable across the edges of the support in frictional engagement with the marginal portion of the cover to tension the cover, a pressure pad movable toward and away from said support and engageable with the panel to press the cover and panel against said support to retain tension in the cover while said friction device remains in contact with the marginal portion of the cover, said frame being movable past said support to release the marginal portion of the cover and movable in reverse direction to start to form the marginal portion of the cover around the panel, and flexible diaphragm means actuated by fluid pressure to conform to the edge and cover edge portion of the panel to turn the marginal edge portion of the cover and to press it firmly and uniformly against the rear edge portion of the panel.

2. Apparatus for tensioning and edge turning a cover of a laminated panel, which comprises a support conforming closely in size and shape to the panel against which the panel with its cover is positioned with the cover interposed between the panel and support with marginal portions of the cover extending beyond the edges of the panel and support, a frame movable relative to said support perpendicular to the plane of the panel, a friction device on said frame movable across the edges of the support in frictional engagement with the marginal portion of the cover to tension the cover, a pressure pad movable toward and away from said support and engageable with the panel to press the cover and panel against said support to retain tension in the cover while said friction device remains in contact with the marginal portion of the cover, said frame being movable past said support to release the marginal portion of the cover and movable in reverse direction to start to form the marginal portion of the cover around the panel, and flexible diaphragm means actuated by fluid pressure to conform to the edge and cover edge portion of the panel to turn the marginal edge portion of the cover and to press it firmly and uniformly against the rear edge portion of the panel, a sealing plate on which said pressure pad is mounted, sealing means on said plate engageable with one side of said frame, a sealing device engageable in sealing relation with the other side of said frame and with the edge portion of said support at the side opposite the panel, said diapharagm means carried by said frame, and means for applying differential fluid pressure at opposite sides of said diaphragm means.

3. Apparatus for tensioning and edge turning a cover of a laminated panel, which comprises a support conforming closely in size and shape to the panel against which the panel with its cover is positioned with the cover interposed between the panel and support with marginal portions of the cover extending beyond the edges of the panel and support, a frame movable relative to said support perpendicular to the plane of the panel, a friction device on said frame movable across the edges of the support in frictional engagement with the marginal portion of the cover to tension the cover, a pressure pad movable toward and away from said support and engageable with the panel to press the cover and panel against said support to retain tension in the cover while said friction device remains in contact with the marginal portion of the cover, said frame being movable past said support to release the marginal portion of the cover and movable in reverse direction to start to form the marginal portion of the cover around the panel, and flexible diaphragm means actuated by fluid pressure to conform to the edge and cover edge portion of the panel to turn the marginal edge portion of the cover and to press it firmly and uniformly against the rear edge portion of the panel, a sealing plate on which said pressure pad is mounted, sealing means on said plate engageable with one side of said frame, a sealing device engageable in sealing relation with the other side of said frame and with the edge portion of said support at the side opposite the panel, said diaphragm means carried by said frame, and means for applying differential fluid pressure at opposite sides of said diaphragm means, and means carried by said frame having interlocking engagement with said sealing device to interlock with said sealing device to carry said sealing device as it reverses its tensioning stroke to carry said sealing device into engagement with said support.

4. Apparatus for tensioning and edge turning a cover of a laminated panel, which comprises a support conforming closely in size and shape to the panel against which the panel with its cover is positioned with the cover interposed between the panel and support with marginal portions of the cover extending beyond the edges of the panel and support, a frame movable relative to said support perpendicular to the plane of the panel, a friction device on said frame movable across the edges of the support in frictional engagement with the marginal portion of the cover to tension the cover, a pressure pad movable toward and away from said support and engageable with the panel to press the cover and panel against said support to retain tension in the cover while said friction device remains in contact with the marginal portion of the cover, said frame being movable past said support to release the marginal portion of the cover and movable in reverse direction to start to form the marginal portion of the cover around the panel, and flexible diaphragm means actuated by fluid pressure to conform to the edge and cover edge portion of the panel to turn the marginal edge portion of the cover and to press it firmly and uniformly against the rear edge portion of the panel, a sealing plate on which said pressure pad is mounted, sealing means on said plate engageable with one side of said frame, a sealing device engageable in sealing relation with the other side of said frame and with the edge portion of said support at the side opposite the panel, said diaphragm means carried by said frame, and means for applying differential fluid pressure at opposite sides of said diaphragm means, and means carried by said frame having interlocking engagement with said sealing device to interlock with said sealing device to carry said sealing device as it reverses its tensioning stroke to carry said sealing device into engagement with said support, said pressure pad being notched to allow air passage, and the means for applying differential pressure comprising a suction line connected to said frame at one side of said diaphragm and a second suction line extending through said sealing plate.

5. Apparatus for tensioning and edge turning a cover over a panel comprising a stationary support conforming in size and shape to a panel on which the panel and cover are supported with the cover between said support and the panel and with the marginal portion of the cover extending beyond the edges of said support and panel, a hollow frame relatively movable in a direction from the panel across the cover and across the edge of said support, frictional tensioning means on said frame engageable with the marginal edge portion of the cover to tension said cover on said support, pressure means operable to press the panel against said support to retain tension in the cover, and means carried by said frame for turning the marginal edge of the cover around the edge of the panel and pressing it against the rear of the panel.

6. Apparatus of the class described comprising a flat horizontal support conforming in size and shape to a panel to be covered and adapted to support a panel and cover thereon with the cover beneath the panel and with the margin of the cover extending beyond the edge of said support, frictional tensioning means engageable with the margin of the cover and relatively movable downwardly with respect to said support to tension the cover, pressure means to press the panel against the cover to retain tension in the cover, and means for turning the margin of the cover upwardly and inwardly to press it against the top edge portion of the panel.

7. Automatic edge turning apparatus comprising a plurality of supports, each being of a size and shape conforming to a panel to be covered, means for advancing said supports serially to an edge turning station from a loading station, applicator means for applying adhesive to the edge portion of panels on said supports intermediate said loading and edge turning stations, means at said edge turning station for tensioning a cover independently of its associated panel, clamping means at said edge turning station for pressing a tensioned cover and panel together near the edge of the panel to retain tension in the cover, and means at the edge turning station for turning the edge portion of the cover and pressing it against the adhesive on the panel.

8. Automatic edge turning apparatus comprising a plurality of supports, each being of a size and shape conforming to a panel to be covered, means for advancing said supports serially to an edge turning station from a loading station, applicator means for applying adhesive to the edge portion of panels on said supports intermediate said loading and edge turning stations, means at said edge turning station for tensioning a cover on a support independently of its associated panel, clamping means at said edge turning station for pressing a tensioned cover and panel together near the edge of the panel to retain tension in the cover, and means at the edge turning station for turning the edge portion of the cover and pressing it against the adhesive on the panel, said last means comprising a flexible diaphragm and means for forming said diaphragm to conform to the rear edge portion of a panel.

9. Apparatus for tensioning and edge turning a cover on a panel which comprises a support conforming in size and shape to the panel and on which the panel is supported with the cover intermediate the panel and said support, friction means for drawing the margins of the cover downwardly on the support to tension the cover, clamping means for pressing the marginal portions of the panel and cover against said support to retain the tension in the cover, means for moving said friction means first downwardly below the edge of the panel and then upwardly above the edge thereof, and diaphragm means movable inwardly over the top edge of the panel to turn the edge of the cover.

10. In apparatus of the class described, a main frame, a support on said frame adapted to be stationary during an operating cycle, a cover tensioning and edge turning frame having an upper clearance position and movable therefrom in a tensioning stroke to a first intermediate position, thence to a lower limiting position, thence to a second intermediate edge turning position, and thence again to the upper clearance position, and power means for effecting the aforesaid successive movements of said cover tensioning and edge turning frame comprising a stationary cylinder on said main frame, a first piston movable in said stationary cylinder, a piston rod connected to said piston, a second piston on said rod, a movable cylinder on said second piston, and means connecting said movable cylinder to said tensioning and edge turning frame.

11. In apparatus of the class described, a main frame, a support on said frame adapted to be stationary during an operating cycle, a cover tensioning and edge turning frame having an upper clearance position and movable therefrom in a tensioning stroke to a first intermediate position, thence to a lower limiting position, thence to a second intermediate edge turning position, and thence again to the upper clearance position, and power means for effecting the aforesaid successive movements of said cover tensioning and edge turning frame comprising a stationary cylinder on said main frame, a first piston movable in said stationary cylinder, a piston rod connected to said piston, a second piston on said rod, a movable cylinder on said second piston, and means connecting said movable cylinder to said tensioning and edge turning frame, a third cylinder on said main frame, a piston therein, a pressure pad connected to said piston, said pad being movable into engagement with a panel and cover assembly following movement of said tensioning and edge turning frame to its first intermediate position.

12. In apparatus of the class described, a main frame, a support on said frame adapted to be stationary during an operating cycle, a cover tensioning and edge turning frame having an upper clearance position and movable therefrom in a tensioning stroke to a first intermediate position, thence to a lower limiting position, thence to a second intermediate edge turning position, and thence again to the upper clearance position, and power means for effecting the aforesaid successive movements of said cover tensioning and edge turning frame comprising a stationary cylinder on said main frame, a first piston movable in said stationary cylinder, a piston rod connected to said piston, a second piston on said rod, a movable cylinder on said second piston, and means connecting said movable cylinder to said tensioning and edge turning frame, a third cylinder on said main frame, a piston therein, a pressure pad connected to said piston, said pad being movable into engagement with a panel and cover assembly following movement of said tensioning and edge turning frame to its first intermediate position, said tensioning and edge turning frame having frictional means for engagement with the margin of a cover, and an inwardly movable diaphragm for turning the margins of the cover inwardly over the top edge portion of the panel and for pressing them downwardly to adhere them thereto.

13. The method of applying a cover to a panel, comprising the steps of supporting said panel upon a support conforming in size and shape to the panel, with a cover interposed between the panel and support and with the marginal portions of said cover extending outwardly beyond the edges of said support and panel, drawing said marginal portions of the cover downwardly over the edge portions of said support to tension the cover, clamping the body of the panel against the cover to retain tension in the cover, moving said marginal portions upwardly relative to said support and panel, and pressing said marginal portions inwardly over and downwardly against the upper face of said panel.

14. The method of applying a cover to a panel, comprising the steps of supporting said panel upon a support conforming in size and shape to the panel, with a cover interposed between the panel and support and with the marginal portions of said cover extending outwardly beyond the edges of said support and panel, drawing said marginal portions of the cover downwardly over the edge portions of said support to tension the cover, clamping the body of the panel upon the cover to retain tension in the cover, moving said marginal portions upwardly relative to said support and panel, folding said marginal portions inwardly over and downwardly against the upper face of said panel, and applying pressure upon said folded marginal portions for a predetermined interval.

15. The method of applying a cover to a panel having a band of adhesive applied to the marginal upper surface thereof, comprising the steps of supporting said panel upon a support conforming in size and shape to the panel, with a cover interposed between the panel and support and with the marginal portions of said cover extending outwardly beyond the edges of said support and panel, drawing said marginal portions of the cover downwardly over the edge portions of said support to tension the cover, clamping the body of the panel against the cover to retain tension in the cover, moving said marginal portions upwardly relative to said support and panel, and pressing said marginal portions inwardly over and downwardly against the band of adhesive.

16. Apparatus of the class described comprising a horizontal support conforming in size and shape to a panel to be covered and adapted to support thereon a panel and a cover therefor, with the cover interposed between the panel and support and with marginal portions of said cover extending outwardly beyond the edges of said support and panel, means for applying to the marginal upper surface of the panel a band of adhesive, means for applying a frictional drag to the marginal portions of said cover to draw said marginal portions downwardly over the edge portions of said support to tension said cover, means for clamping the body of said panel inwardly from said adhesive band upon said cover to retain tension in the cover, said frame being movable downwardly past said support while the body of said panel is clamped upon said cover to release the marginal portions of said cover and movable upwardly to raise the marginal portions of said cover relative to the edges of said panel, and means for pressing said raised marginal portions inwardly over and downwardly against said band of adhesive.

17. Apparatus of the class described comprising a horizontal support conforming in size and shape to a panel to be covered and adapted to support thereon a panel and a cover therefor, with the cover interposed between the panel and support and with marginal portions of said cover extending outwardly beyond the edges of said support and panel, means for applying to the marginal upper surface of the panel a band of adhesive, a hollow frame of greater area than the support movable vertically relative thereto, means carried by said frame and operable during downward movement thereof relative to said support for applying a frictional drag to the marginal portions of said cover to draw said marginal portions downwardly over the edge portions of said support to tension said cover, means separate from and movable within said frame for clamping the body of said panel inwardly from said adhesive band upon said cover to retain tension in the cover, said frame being movable downwardly past said support while the body of said panel is clamped upon said cover to release the marginal portions of said cover and movable upwardly to raise the marginal portions of said cover relative to the edges of said panel, and means carried by said frame for pressing said raised marginal portions inwardly over and downwardly against said band of adhesive.

18. Apparatus of the class described comprising a horizontally movable horizontal support conforming in size and shape to a panel to be covered and adapted to support thereon a panel and a cover therefor, with the cover interposed between the panel and support and with marginal portions of said cover extending outwardly beyond the edges of said support and panel, means operable when said support is in one position for applying to the marginal upper surface of the panel a band of adhesive, a hollow frame of greater area than the support movable vertically relative thereto when said support is in another position, means carried by said frame and operable during downward movement thereof relative to said support for applying a frictional drag to the marginal portions of said cover to draw said marginal portions downwardly over the edge portions of said support to tension said cover, means separate from and movable within said frame for clamping the body of said panel inwardly from said adhesive band upon said cover to retain tension in the cover, said frame being movable downwardly past said support while the body of said panel is clamped upon said cover to release the marginal portions of said cover and movable upwardly to raise the marginal portions of said cover relative to the edges of said panel, and means carried by said frame for pressing said raised marginal portions inwardly over and downwardly against said band of adhesive.

19. Apparatus for tensioning and edge turning a cover relative to a panel board of a laminated panel, comprising a horizontal support conforming closely in size and shape to the panel against which the panel board with its cover is positioned with the cover interposed between the panel board and support and with marginal portions of the cover extending beyond the edges of the panel and support, a frame of greater area than the support movable vertically relative thereto, a friction device carried by said frame and operable during downward movement of said frame relative to said support to move across the edges of the support in frictional engagement with the marginal portions of the cover to tension the cover, a pressure pad movable vertically relative to said support and engageable with the panel board to press the cover and panel board against said support to retain tension in the cover while said friction device remains in contact with the marginal portion of the cover, said frame being movable downwardly past said support to release the marginal portions of the cover and movable in reverse direction to raise the marginal portions of the cover relative to the edges of the panel board, and flexible diaphragm means also carried by said frame and operable by fluid pressure to turn the raised marginal edge portion of the cover inwardly over and downwardly against the marginal upper surface of said panel board.

References Cited in the file of this patent

UNITED STATES PATENTS

| 1,774,963 | Collins | Sept. 2, 1930 |
| 2,040,124 | Cummings | May 12, 1936 |
| 2,056,450 | Haberstump | Oct. 6, 1936 |
| 2,576,121 | Kamborian | Nov. 27, 1951 |
| 2,617,127 | Stacy | Nov. 11, 1952 |
| 2,705,522 | Kamborian | Apr. 5, 1955 |

FOREIGN PATENTS

| 8,056 | Great Britain | of 1909 |
| 236,156 | Switzerland | of 1945 |